W. S. McLEAN.
SAW TOOTH.
APPLICATION FILED DEC. 29, 1913.
1,105,153.
Patented July 28, 1914.
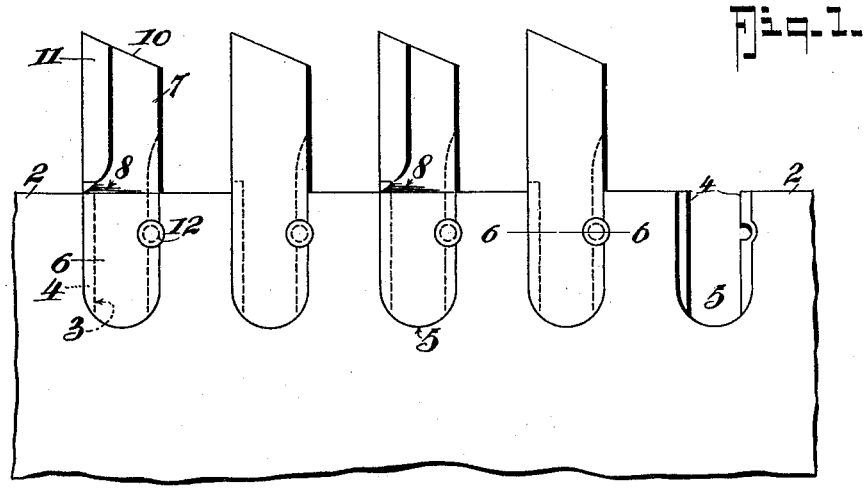
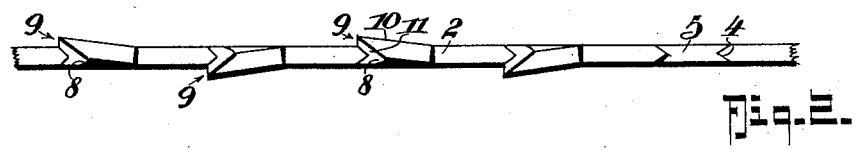
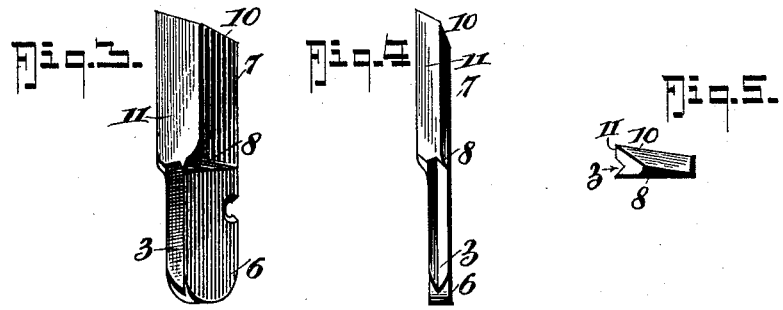
WITNESSES:
John G. Schrott
Charles Diller.
INVENTOR
William S. McLean
BY
Fred G. Dieterich Co.
ATTORNEYS.
THE NORRIS PETERS CO., PHOTO-LITHO., WASHINGTON, D. C.

UNITED STATES PATENT OFFICE.

WILLIAM S. McLEAN, OF VANCOUVER, BRITISH COLUMBIA, CANADA.

SAW-TOOTH.

1,105,153.  Specification of Letters Patent.  Patented July 28, 1914.

Application filed December 29, 1913. Serial No. 809,243.

*To all whom it may concern:*

Be it known that I, WILLIAM S. McLEAN, a citizen of the Dominion of Canada, residing at Vancouver, in the Province of British Columbia, Canada, have invented certain new and useful Improvements in Saw-Teeth, of which the following is a specification.

This invention relates to an inserted saw tooth which is particularly designed for cut off saws but may be applicable to saws of other classes.

The improvement is directed to a simplification in the construction of the "bit" rendering it cheaper to manufacture and of less weight.

The invention is particularly described in the following specification, reference being made to the drawings by which it is accompanied in which:

Figure 1 is a side elevation of a portion of a saw blade having this improved tooth. Fig. 2 is a plan of the same. Figs. 3, 4, and 5 show the bit detached in perspective, edge and end views. Fig. 6 is a section on line 6—6 on Fig. 1.

The tooth bit is of pillar form and is substantially parallel in width and thickness. The portion 6 of it, which is inserted in the blade 2 of the saw, is rounded at its extreme end, as shown in the drawing, and is provided with a V groove 3 along each edge, which grooves fit on corresponding V edges 4 of the seat 5 in which the bit is inserted in the blade 2 of the saw. This V groove 3 is not shown in the drawing as carried around the end of the bit but this may be done if thought desirable without departing from the spirit of the invention.

That portion 7 of the bit, which projects beyond the blade 2 of the saw to form the tooth, is offset, as at 8, to one side and the other in alternate teeth, which offset is given to the bit immediately adjacent to the edge of the blade 2 and in the length of the bit is substantially parallel to the plane of the saw blade, but in the width of the bit this set is less at the back edge of the tooth than at the front so that the outer face of the tooth has a clearance 9 from the face of the cut. The extreme end of the tooth is shaped, as at 10, to an angle sufficient only to afford the necessary clearance under the rate of the saw feed, and the front edge is beveled, as at 11, to form an acute cutting edge. These bits are secured in their seats 5 in the blade 2 so as to be radial to the edge of it, although if desired they may be inserted to give any desired angle. They are secured in position by a rivet 12, half in the saw blade and half in the bit.

It will be noticed that the saw blade is not stamped to form a gullet between each pair of teeth, the necessary gullet space being provided in the space between the teeth, and the full strength of the saw blade is thus retained to support the bits. These bits can be very cheaply manufactured as they can be directly sheared from a bar of the required width and thickness, the offset 8 being stamped at the same time, and thereafter the required milling of the grooves 3 and grinding of the cutting face 11 can be performed. The seats in the saw blade are correspondingly simple.

The knife-like cutting edge of the tooth and the fact that the offset of it is parallel to the plane of the cut enables a saw fitted with these teeth to effect a remarkably smooth and free cut, and the teeth do not require to be reset, although they may be reground.

Having now particularly described my invention, I hereby declare that what I claim as new and desire to be protected in by Letters Patent, is:

1. An inserted tooth for saws which comprises a body having its side faces substantially parallel, that portion of the tooth which is inserted into the blade having provisions for interlocking with the blade, that portion of the tooth which projects from the blade outwardly being off-set to afford the required set, said off-set being parallel to the plane of the blade in its length, and means providing clearance in the width of the bit from the cutting edge.

2. An inserted tooth for saws which is substantially parallel in width and thickness, that portion of the tooth which is insertible in the blade having provision for interlocking with the blade, that portion of the tooth which projects from the blade being off-set to afford the required set, said off-set being parallel to the plane of the blade in its length and inclined backwardly thereto in its width to afford clearance from the cutting edge.

3. An inserted tooth for saws comprising a body of substantially uniform width and thickness throughout its length, that portion of the body which is adapted for insertion into the saw blade, having provision for interlocking with the saw blade, that portion of the body which extends from the saw blade outwardly being twisted and off-set adjacent to the saw blade, whereby the front cutting edge of the tooth will lie to one side of the plane of the blade and substantially parallel thereto, while the rear edges of the body of the tooth will extend parallelly in the plane of the blade, to thereby cause that portion of the side faces of the tooth body which lie beyond the edge of the saw blade to lie in planes extending at an angle to the saw tooth in the width but extending in the same direction as the plane of the saw blade in the length.

In testimony whereof I affix my signature in presence of two witnesses.

WILLIAM S. McLEAN.

Witnesses:
ROWLAND BRITTAIN,
MAY WHYTE.

Copies of this patent may be obtained for five cents each, by addressing the "Commissioner of Patents, Washington, D. C."